United States Patent [19]

Gannon et al.

[11] Patent Number: 4,914,164

[45] Date of Patent: Apr. 3, 1990

[54] METHOD OF COATING WITH POLYGLYCIDYL ETHER OF SORBITOL AND POLYAMIDOAMINE

[75] Inventors: John A. Gannon, Danbury, Conn.; Vincent Brytus, Mahopac; Joseph S. Puglisi, Crompond, both of N.Y.

[73] Assignee: Ciba-Geigy Corporation, Ardsley, N.Y.

[21] Appl. No.: 145,675

[22] Filed: Jan. 14, 1988

Related U.S. Application Data

[63] Continuation-in-part of Ser. No. 47,525, May 4, 1987, abandoned, which is a continuation of Ser. No. 847,338, Apr. 2, 1986, abandoned.

[51] Int. Cl.$^4$ ............................................. C08L 63/00
[52] U.S. Cl. ...................... 525/523; 525/530
[58] Field of Search ................. 525/523, 530

[56] References Cited

U.S. PATENT DOCUMENTS

| | | | |
|---|---|---|---|
| 2,994,673 | 8/1961 | Capron et al. | 525/530 |
| 3,085,075 | 4/1963 | Lockshin et al. | 525/530 |
| 3,647,728 | 3/1972 | Deflorin et al. | 525/530 |
| 3,956,208 | 5/1976 | Hoki et al. | 525/530 |

FOREIGN PATENT DOCUMENTS 0988484 4/1965 United Kingdom ................ 525/530

*Primary Examiner*—John C. Bleutge
*Assistant Examiner*—Robert E. L. Sellers, II
*Attorney, Agent, or Firm*—Luther A. R. Hall

[57] ABSTRACT

Coating compositions containing a polyfunctional glycidyl ether of sorbitol cured at ambient temperature with polyamidoamine hardeners exhibit unexpectedly high resistance to loss of gloss when exposed to weathering conditions. The cured product also have good mechanical and chemical properties.

2 Claims, No Drawings

METHOD OF COATING WITH POLYGLYCIDYL ETHER OF SORBITOL AND POLYAMIDOAMINE

Coatings of a polyfunctional glycidyl ether of sorbitol cured with polyamidoamine hardeners exhibit high resistance to loss of gloss when exposed in outdoor applications.

BACKGROUND OF THE INVENTION

While cured epoxy resin systems based on bisphenol A and other aromatic polyols generally exhibit good mechanical properties, they show a relatively poor resistance to weathering in outdoor applications or upon exposure to ultraviolet light.

Since such weathering problems are clearly understood to be related to the aromatic moieties in the bisphenol A epoxy resins, epoxy resins having no aromatic moieties have been made. Lee and Neville, Handbook of Epoxy Resins, McGraw-Hill, New York, 1967, p 2–16 describes such epoxy resins derived from aliphatic polyols.

High molecular weight polyglycidyl ethers, prepared by the hydroformylation of oleyl alcohol and related unsaturated alkenols followed by glycidylation of the polyol formed, are described in U.S. Pat. Nos. 4,388,209 and 4,339,389. Such glycidyl ethers are stated to be curable by a host of hardener types, i.e. amines, anhydrides, acids, polyaminoamides, melamines or mercaptans, with only amine curing being exemplified.

While aliphatic epoxy resins are expected to exhibit better weather-resistance than aromatic epoxy resins, they are usually deficient in such properties as a combination of hardness and flexibility (toughness) and in chemical, solvent and moisture resistance as is taught in U.S. Pat. No. 4,540,752.

U.S. Pat. 4,528,345 describes cycloaliphatic resins prepared by the hydrogenation of the glycidyl ethers of bisphenol A, but points out that in order to cure such resins with polyamide hardeners an induction or pre-reaction period of about one hour is essential lest the cured coating suffer a rapid loss of gloss and surface defects such as blushing and blemishing.

Aliphatic glycidyl ethers have been used in cold-curable, solvent-free coating compositions using cycloaliphatic polyamines as curing agents to give cured coatings with high resistance to organic solvents as described by J. Bersier et al, FATIPEC, 1970, 255–276. Similar coating compositions were tested for color and gloss retention in outdoor weathering applications. Such coatings had excellent resistance to discoloration, but showed a high loss of gloss after only a few months of outdoor exposure as is described by T. Audykowski et al, FATIPEC, 1974, 109–116.

Audykowski et al also teach that such aliphatic glycidyl ethers may be cured at elevated temperatures (180° C.) with anhydride hardeners to give coatings with somewhat better retention of gloss after outdoor exposure than the coatings cured at room temperature with amine hardeners.

R. S. Bauer, FATIPEC, 1980, 102–122, describes pigmented coatings prepared from the diglycidyl ether of hydrogenated bisphenol A (EPONEX DRH-151.2, Shell) cured with a hydrogenated polyaminoamide (VERSAMID 1540, Henkel) or a conventional polyamide (UNI-REZ 2188, Union Camp). These coatings exhibited good retention of gloss after exposure to weathering (Weatherometer and Quick Ultra-violet, QUV testing).

Polyamidoamine hardeners are prepared by dimerizing tall oil fatty acids and then reacting the dimerized acid with aliphatic amines such as diethylenetriamine. These hardeners are described by V. Brytus, Modern Paint and Coatings, 74 (10), 172 (1984). These hardeners are alternatively known as polyamides, as polyaminoamides or as polyamidoamines.

United States Pat. Nos. 2,994,673; 3,956,208; 3,647,728 and 3,085,075 and British Pat. No. 988,484 all teach curable epoxy resin compositions containing an aliphatic polyglycidyl ether of an alkane polyol and a polyamidoamine hardener which can be cured at ambient temperatures.

Only U.S. Pat. No. 2,994,673 and British No. 988,484 mention sorbitol as one possible polyol among a large list of such polyols which might be used to prepare the aliphatic polyglycidyl ether resins. Neither reference exemplifies the use of a polyglycidyl ether of sorbitol and neither reference points out the particularly beneficial effects obtained when a polyglycidyl ether of sorbitol is cured with a polyamidoamine hardener as a method of preparing a protective coating which becomes through-cured in 2 to 24 hours at 5°–80° C.

DETAILED DISCLOSURE

The present invention pertains to a an ambient temperature curable epoxy resin composition, which comprises
(a) a polyglycidyl ether of sorbitol, having more than 2 oxirane groups per molecule, and
(b) an effective amount of a polyamidoamine hardener.

The instant invention also relates to a method of through-curing a coating which comprises
curing at a temperature of 5°–80° C. for a period of 2 to 24 hours a polyfunctional glycidyl ether of sorbitol having at least 2 oxirane groups per molecule with an effective curing amount of a polyamidoamine hardener.

Preferably the curing takes place at 20°–45° C. and the curing time is 2 to 5 hours.

It has now been found that, when one cures a polyglycidyl ether of sorbitol using a polyamidoamine hardener, through-cured coatings are obtained in 2 to 24 hours at 5°–80° C. These coatings exhibit unexpectedly good properties upon exposure to outdoor weathering conditions particularly in regards to the very sensitive property of retention of gloss. The retention of gloss properties are tremendously improved over cured coatings of the same aliphatic glycidyl ethers cured with aliphatic polyamines and are considerably improved over the cycloaliphatic glycidyl ethers cured with the same polyamidoamines.

Further benefits are realized in the instant invention by the combination of a polyglycidyl ether of sorbitol and polyamidoamine hardeners, as exemplified by polyamidoamine hardener XU-283 (CIBA-GEIGY), as seen by the instant compatibility obtained between the epoxy resin and the hardener. Such compatibility is not usually obtainable between aromatic epoxy resins and polyamide hardeners. The compatibility observed in the instant invention enables the instant polyfunctional aliphatic glycidyl ether of sorbitol compositions to attain cured physical and chemical properties without the imposition of special precautions and avoids the need for long induction periods required with liquid aromatic epoxy resins and amidoamine hardeners to achieve useful properties.

The combination of an aliphatic polyglycidyl ether of sorbitol with polyamidoamines provides compositions with improved gloss and gloss retention values over a wide range of stoichiometries. That is, a two or even three-fold departure from the theoretical stoichiometry based on a 1:1 equivalent basis of coreactants (epoxy equivalent weight: active hydrogen equivalent weight in the hardener) still gives cured material with acceptable properties.

Thus, the instant compositions have clear advantages in their ease of their application and in the non-critical stoichiometry of coreactants still giving cured products of acceptable properties.

EXAMPLE 1

Polyglycidyl Ether of Sorbitol

A suspension of 18.2 grams of sorbitol in 60 ml of 1,4-dioxane is heated to reflux. After the addition of 0.25 ml of boron trifluoride-diethyl etherate, 27.8 grams of epichlorohydrin is added dropwise with stirring under a reflux condenser. The molar ratio of sorbitol to epichlorohydrin is 0.1 to 0.3.

An exothermic reaction ensues and the sorbitol gradually goes into solution. After all the epichlorohydrin is added, the reaction is refluxed for 100 minutes. At the end of this reflux period, essentially no epoxy groups can be detected in the reaction mixture.

The 1,4-dioxane solvent is removed from the reaction mixture under reduced pressure (65 mm Hg) at 70° C. The residue is dissolved in 60 grams of toluene and dehydrohalogenated at 50°–55° C. and 60°–80 mm Hg using 30 grams of a 50% aqueous sodium hydroxide solution. The sodium chloride formed is removed by filtration and the residue is washed well with toluene. After removing the toluene in vacuo, the above-identified ether is obtained in a 34.4 gram (98.3%) yield of a light yellow resin with an epoxy content of 0.58 equivalents/100 gram (67.7% of theoretical content).

EXAMPLE 2

Polyglycidyl Ether of Pentaerythritol

A mixture of 3.4 grams of finely ground pentaerythritol in 10 grams of 1,4-dioxane is heated with stirring to reflux. After adding 0.23 grams of tin tetrachloride, 12.95 grams of epichlorohydrin is added dropwise with stirring the mixture being concomitantly refluxed. The molar ratio of pentaerythritol to epichlorohydrin is 0.025 to 0.14. The pentaerythritol dissolves in the course of the reaction. The mixture is cooled to 50° C. The 1,4-dioxane is removed under reduced pressure (60 mm Hg). No epoxy group can be detected in the residue.

Toluene (22 grams) is added and the mixture is distilled at 55°–60° C./100 mg Hg through a water separator while 12 grams of a 50% aqueous sodium hydroxide solution are added dropwise. In total 7.1 grams of water are separated off. The azeotropic distillation is completed and 15 grams of water are added. The mixture is well stirred and then allowed to separate. The toluene solution is washed with 4 grams of 50% aqueous sodium dihydrogen phosphate solution, separated off and dried over anhydrous sodium sulfate. The toluene solution is then distilled at 15 mm Hg till the interval temperature reaches 135° C. The above-named product is obtained in a yield of 10.9 grams (85,9% of theory) as a yellow liquid having the characteristics below.

Epoxide content: 7.15 equivalents/kg. (90.9% of theory)
Chlorine content: 10.45%
Viscosity (25° C.): 460 cp. (460 mPas)
Color number according to Gardner/Holdt: 7

EXAMPLE 3

Using the general procedure of Example 1, the polyfunctional glycidyl ether of glycerol is prepared. The glycidyl ether of glycerol is also available commercially as EPON 812 (Shell).

EXAMPLE 4

100 grams of the liquid epoxy resin prepared in Example 1 is hand stirred with 125 grams of a polyamidoamine hardener (XU-283, CIBA-GEIGY) at ambient temperature.

This formulation is then promptly coated using a conventional doctor knife procedure on a primed steel panel to give a film with a dry film thickness of 6 mils (0.1524 mm). The coated panel is held at room temperature for 7 days to allow the formulation to cure completely.

The pot life, defined as the elapsed time in minutes from the start of mixing the resin and hardener till the time that the gelometer (Techne Gelometer, Princeton, N.J.) stops (=the probe inserted in the mixture is prevented from movement), is 44 minutes.

The through cure time for the coating, which is measured by a Landolt Tester which draws a weighted needle across the coated test panel to simulate a knife cutting through the coating, is determined to be 340 minutes.

The initial specular gloss (as measured by ASTM D523) at 60° geometry and initial color (as measured by ASTM D2244) are determined on the cured coating. These values are 96 and 1.9 respectively.

The resistance of the coating to discoloration and to loss of gloss upon weathering is measured by accelerated weathering in the QUV apparatus for 2200 hours; or by accelerated weathering in a Xenon arc Weatherometer for 1300 hours; or by outdoor exposure to the weather at a 45° angle to the sun for one year in South Florida.

The results of these tests are given in the table below.

|  | initial | after 2200 hours in QUV | after 1300 hours Weatherometer | after 1 year South Florida |
| --- | --- | --- | --- | --- |
| 60° gloss | 96 | 85 | 92 | 60 |
| color | 1.9 | 5.7 | 15.2 | 9.8 |

Even after 1 year exposure under the most rigorous outdoor weathering conditions in South Florida of high temperature, heavy rain and moisture conditions plus strong sunlight, the coatings made from the instant composition still retained more than half the original (initial) gloss.

EXAMPLE 5

Using the same general procedure as given in Example 4, 100 grams of the liquid epoxy resin prepared in Example 1 is hand stirred with 56 grams of a polyamine hardener (HY 2964, CIBA-GEIGY) which is a mixture of aliphatic and cycloaliphatic amines.

The pot life of this formulation is 11 minutes; the through cure time of the formulation is 59 minutes. The cured coating has an initial gloss of 96 and initial color of 2.5.

The cured coating after weathering has the values given in the table below.

|  | initial | after 1500 hours in QUV | after 700 hours Weatherometer | after 1 year South Florida |
| --- | --- | --- | --- | --- |
| 60° gloss | 96 | 57 | 80 | 0 |
| color | 2.5 | 4.8 | 5.5 | 5.9 |

There was a considerable loss of gloss after only 1500 hours in the QUV, and after 1 year in South Florida all gloss was lost.

EXAMPLE 6

Using the same general procedure as given in Example 4, 100 grams of the liquid resin which is the diglycidyl ether of bisphenol A (ARALDITE 6010, CIBA-GEIGY) is hand stirred with 70 grams of polyamidoamine hardener (XU 283, CIBA-GEIGY).

The pot life of this formulation is 226 minutes; the through cure time of the formulation is 476 minutes. The cured coating has an initial gloss of 91 and initial color of 0.4.

The cured coating after weathering has the value given in the table below.

|  | initial | after 2200 hours in QUV | after 400 hours Weatherometer | after 1 year South Florida |
| --- | --- | --- | --- | --- |
| 60° gloss | 91 | 17 | 18 | 0 |
| color | 0.4 | 5.4 | 9.0 | 9.6 |

This formulation contains aromatic moieties accounting for the poor gloss retention and discoloration which even the use of the polyamidoamine hardener cannot overcome.

EXAMPLE 7

Using the same general procedure as given in Example 4, 100 grams of the liquid resin which is the diglycidyl ether of hydrogenated bisphenol A (EPONEX DRH-151.2, Shell) is hand stirred with 56.6 grams of a modified polyamidoamine hardener (XU-283, CIBA-GEIGY) at ambient temperature.

The cured coating after weathering has the values given in the tables below.

| 60° Gloss Values after hours exposure in QUV | | | | | | |
| --- | --- | --- | --- | --- | --- | --- |
| Initial | 72 | 166 | 238 | 331 | 416 | 486 |
| 64 | 31 | 9 | 5 | 3 | 3 | 3 |

| 60° Gloss Values after hours exposure in Weatherometer | | | | |
| --- | --- | --- | --- | --- |
| Initial | 100 | 200 | 300 | 400 |
| 68 | 46 | 12 | 8 | 7 |

The glycidyl ether of sorbitol prepared in Example 1 is cured at room temperature with two different polyamidoamine hardeners. As a comparison the diglycidyl ether of hydrogenated bisphenol A (EPONEX 151.3, Shell) is cured at room temperature using the same two polyamidoamine hardeners. The time to achieve a through-cure surface is set forth in the table below.

Inspection of the data given in the table shows that the instant glycidyl ether of sorbitol cures through considerably faster than does the diglycidyl ether of hydrogenated bisphenol A (EPONEX 151.3) using either of the two polyamidoamine hardeners.

| Composition* Property | 1 | 2 | 3 | 4 | 5 | 6 |
| --- | --- | --- | --- | --- | --- | --- |
| Epoxy Resin I | 100 | — | 100 | — | 100 | — |
| Epoxy Resin II | — | 100 | — | 100 | — | 100 |
| Hardener A | 68 | 56 |  |  |  |  |
| Hardener B** |  |  | 51.3 | 42.6 | 100 | 90 |
| Through Cure Time (hours:minutes) | 5:40 | >12:00 | 2:54 | >24 hrs. | 2:45 | 17:10 |

*Epoxy Resin I is the glycidyl ether of sorbitol (Example 1)
Epoxy Resin II is the glycidyl ether of hydrogenated bisphenol A (EPONEX 151.3, Shell)
Hardener A is polyamidoamine XU 283 (CIBA-GEIGY)
Hardener B is polyamidoamine HY 815 (CIBA-GEIGY)
(Compositions values are in a parts by weight of)

EXAMPLE 9

The instant glycidyl ether of sorbitol is particularly effective in giving fast through-cure compared to the glycidyl ethers of other alkane polyols structurally related to sorbitol. This is seen in the table below where the glycidyl ethers of sorbitol, pentaerythritol and glycerol are each cured with the same polyamidoamine hardener at room temperature and through-cure times are recorded.

The instant glycidyl ether of sorbitol cured nearly twice as fast as did the glycidyl ethers of pentaerythritol and glycerol.

thus, if fast cure time to prepare cured coatings is desired, the selection of the glycidyl ether of sorbitol is clearly indicated from among the glycidyl ethers of the alkane polyols.

| Composition* Property | 1 | 2 | 3 |
| --- | --- | --- | --- |
| Epoxy Resin I | 100 |  |  |
| Epoxy Resin III |  | 100 |  |
| Epoxy Resin IV |  |  | 100 |
| Hardener A | 67.5 | 97 | 91 |
| Through Cure Time (hours:minutes) | 2:16 | 4:44** | 4:32 |
| Gel Time (hours:minutes) | 0:44 | 2:57** | 3:45 |

*Epoxy Resin I is glycidyl ether of sorbitol (Example 1)
Epoxy Resin III is glycidyl ether of pentaerythritol (Example 2)
Epoxy Resin IV is glycidyl ether of glycerol (Example 3, EPON 812)
Hardener A is polyamidoamine HY 283 (CIBA-GEIGY)
(composition values are in parts by weight of)
**includes a 1:20 induction period before curing begins.

What is claimed is:

1. A method of through-curing a coating which comprises
   curing at a temperature of 5°–80° C. for a period of 2 to 24 hours a polyfunctional glycidyl ether of sorbitol having at least 2 oxirane groups per molecule with an effective curing amount of a polyamidoamine hardener.

2. A method according to claim 1 wherein the temperature is 20°–45° C. and the curing time is 2 to 5 hours.

* * * * *